(12) United States Patent
Otsubo et al.

(10) Patent No.: US 12,247,959 B2
(45) Date of Patent: Mar. 11, 2025

(54) FLOW PASSAGE SWITCHING VALVE, FLOW PASSAGE SWITCHING VALVE SYSTEM, AND LIQUID CHROMATOGRAPH

(71) Applicant: HITACHI HIGH-TECH CORPORATION, Tokyo (JP)

(72) Inventors: Ayano Otsubo, Tokyo (JP); Nobuhiro Tsukada, Tokyo (JP); Hisao Inami, Tokyo (JP); Shoji Tomida, Tokyo (JP); Mitsuhiko Ueda, Tokyo (JP); Daisuke Akieda, Tokyo (JP); Kenichiro Nishiki, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 266 days.

(21) Appl. No.: 17/764,613

(22) PCT Filed: Sep. 10, 2020

(86) PCT No.: PCT/JP2020/034266
§ 371 (c)(1),
(2) Date: Mar. 29, 2022

(87) PCT Pub. No.: WO2021/075184
PCT Pub. Date: Apr. 22, 2021

(65) Prior Publication Data
US 2022/0326197 A1    Oct. 13, 2022

(30) Foreign Application Priority Data

Oct. 17, 2019  (JP) ................................ 2019-190312

(51) Int. Cl.
*G01N 30/38*     (2006.01)
*F16K 11/074*    (2006.01)
(Continued)

(52) U.S. Cl.
CPC ............ *G01N 30/38* (2013.01); *F16K 11/074* (2013.01); *F16K 11/0743* (2013.01);
(Continued)

(58) Field of Classification Search
CPC ........ G01N 30/26; G01N 30/20; G01N 30/38; G01N 2030/201; G01N 2030/202;
(Continued)

(56) References Cited

U.S. PATENT DOCUMENTS 4,068,528 A * 1/1978 Gundelfinger ......... G01N 30/20
                                                    73/864.84
5,958,227 A * 9/1999 Uematsu ............... G01N 30/468
                                                    210/659
(Continued)

FOREIGN PATENT DOCUMENTS

JP   2009-139376 A   6/2009
WO   2009/041442 A1  4/2009

OTHER PUBLICATIONS

International Search Report of PCT/JP2020/034266 dated Nov. 10, 2020.
(Continued)

*Primary Examiner* — Helen C Kwok
(74) *Attorney, Agent, or Firm* — MATTINGLY & MALUR, PC

(57) ABSTRACT

A flowpath switch valve is configured for extended service life by spreading the region, of the sliding surfaces of a stator and a rotor, that is subject to wear over the entirety of the sliding surfaces. The stator has fixed stator flowpaths, and the rotor has rotor flowpaths. A flowpath switch valve, depending on the rotor rotation state, realizes connection patterns that include: a first connection pattern wherein a rotor flowpath 241 connects a fixed stator flowpath 31 and a fixed stator flowpath 32; a second connection pattern
(Continued)

wherein the rotor flowpath 241 connects the fixed stator flowpath 31 and a fixed stator flowpath 36; a third connection pattern wherein a rotor flowpath 242 connects the fixed stator flowpath 31 and the fixed stator flowpath 32; and a fourth connection pattern wherein the rotor flowpath 242 connects the fixed stator flowpath 31 and the fixed stator flowpath 36.

6 Claims, 8 Drawing Sheets

(51) Int. Cl.
*F16K 37/00* (2006.01)
*G01N 30/20* (2006.01)
*G01N 30/26* (2006.01)

(52) U.S. Cl.
CPC ........ *F16K 37/0041* (2013.01); *F16K 37/005* (2013.01); *G01N 30/20* (2013.01); *G01N 30/26* (2013.01); *G01N 2030/385* (2013.01)

(58) Field of Classification Search
CPC ........... G01N 2030/385; F16K 11/0743; F16K 11/074; F16K 37/0041; F16K 37/005
See application file for complete search history.

(56) References Cited

U.S. PATENT DOCUMENTS

| | | | |
|---|---|---|---|
| 6,012,487 A | 1/2000 | Hauck | |
| 8,196,456 B2* | 6/2012 | Hochgraeber | G01N 30/20 73/61.55 |
| 2007/0251302 A1* | 11/2007 | Iwata | G01N 30/32 73/61.56 |
| 2008/0000353 A1 | 1/2008 | Rarig et al. | |
| 2009/0050212 A1* | 2/2009 | Dourdeville | G01N 30/20 137/625.46 |
| 2009/0145205 A1* | 6/2009 | Hochgraeber | G01N 35/1097 73/61.55 |
| 2010/0206411 A1* | 8/2010 | Maeda | G01N 30/24 137/625.17 |
| 2010/0269936 A1* | 10/2010 | Tomita | G01N 30/20 137/625.46 |
| 2010/0288025 A1* | 11/2010 | Hochgraeber | G01N 30/20 73/61.55 |
| 2011/0232373 A1* | 9/2011 | Desmet | F16K 99/0013 73/61.56 |
| 2012/0103887 A1* | 5/2012 | Maeda | F16K 39/045 210/198.2 |
| 2013/0056084 A1* | 3/2013 | Dourdeville | G01N 30/20 137/14 |
| 2013/0206240 A1* | 8/2013 | Gerhardt | F16K 11/00 137/625.46 |
| 2014/0007660 A1* | 1/2014 | Moeller | G01N 30/38 73/61.56 |
| 2014/0137967 A1* | 5/2014 | Chen | G01N 30/20 137/625.21 |
| 2016/0299168 A1* | 10/2016 | Tsukada | G01N 35/1004 |
| 2016/0377184 A1* | 12/2016 | Hara | F16K 11/0743 73/61.56 |
| 2017/0219539 A1 | 8/2017 | Wachinger | |
| 2017/0284980 A1* | 10/2017 | Hochgraeber | F16K 11/076 |
| 2017/0343518 A1* | 11/2017 | Thielsch | G01N 30/32 |
| 2018/0306758 A1* | 10/2018 | Wachinger | G01N 30/20 |
| 2019/0113484 A1* | 4/2019 | Hochgraeber | G01N 30/32 |
| 2020/0340957 A1* | 10/2020 | Nogami | G01N 30/38 |
| 2021/0382018 A1* | 12/2021 | Otsubo | G01N 30/32 |

OTHER PUBLICATIONS

Extended European Search Report received in corresponding European Application No. 20877089.1 dated Oct. 10, 2023.

* cited by examiner

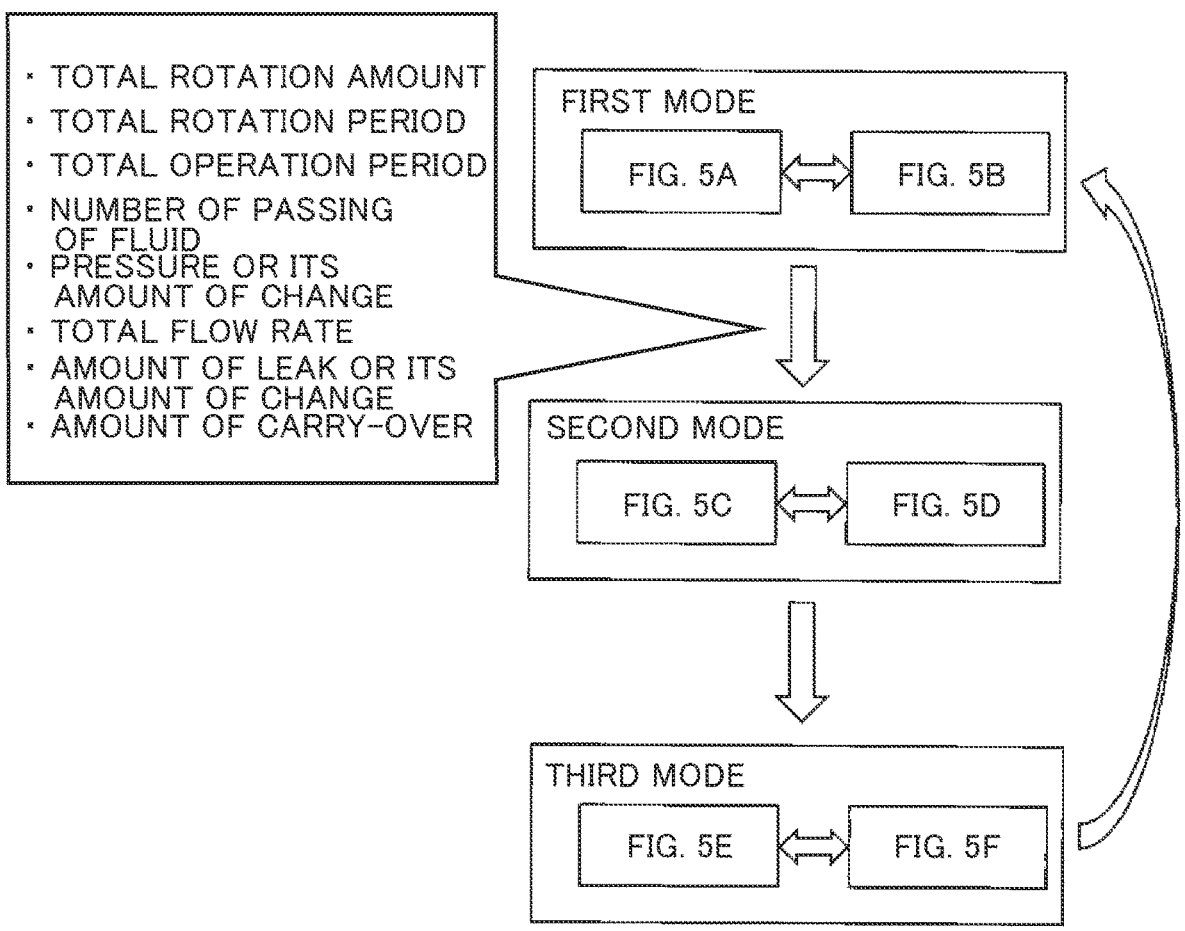

FLOW PASSAGE SWITCHING VALVE, FLOW PASSAGE SWITCHING VALVE SYSTEM, AND LIQUID CHROMATOGRAPH

TECHNICAL FIELD

The present invention relates to a flow passage switching valve, a flow passage switching valve system, and a liquid chromatograph.

BACKGROUND ART

An analyzing device such as a liquid chromatograph has a flow passage switching valve for switching between many flow passages. The flow passage switching valve is configured of a stator for pipe coupling, a rotor seal, a rotor to rotate the rotor seal, and a housing to hold such components. The rotor seal is pressed to the stator by a spring or the like to maintain fluid-tightness between flow passages formed in the rotor seal and flow passages formed in the stator. The rotor seal is fixed to the rotor by a pin and rotated along with rotation of the rotor by a motor, so that each flow passage in the rotor seal is switched with respect to the respective flow passages in the stator.

The rotor seal of the flow passage switching valve slidably rotates while being pressed to the stator. Thus, a sliding surface between the rotor seal and the stator is abraded during rotation of the rotor seal, and when the amount of abrasion exceeds a certain value, liquid leakage occurs, which impairs the function of the valve.

Patent Literature 1 discloses a flow passage switching valve having a structure that suppresses such abrasion of the sliding surface. The flow passage switching valve of Patent Literature 1 is characterized by including a stator, and a rotor that has a surface to be in contact with one surface of the stator and a surface to be in contact with the one surface of the stator and rotates while sliding on the contact surface, where the stator has a plurality of liquid circulation ports opened to the contact surface, the rotor has a plurality of flow passage grooves to connect the liquid circulation ports together, and a rotor seal has a pressure release groove. In the flow passage switching valve, the rotor seal is extended concentrically on the circumference along a sufficiently long pressure release area, which sufficiently reduces a flow rate of a fluid generated when the pressure release groove overlaps a port opening of the stator, and in turn avoids damage on the flow passages in the stator and the rotor seal. It is therefore possible to prevent the contact surface from being scraped by an edge of the port opening during rotor rotation, and thus prevent the operating life from being reduced by abrasion or damage of the flow passage.

An example of such a flow passage switching valve is also described in Patent Literature 2 that describes a configuration of a flow passage switching valve capable of switching between a first state and a second state.

CITATION LIST

Patent Literature

Patent Literature 1: Japanese Unexamined Patent Application Publication No. 2009-139376.
Patent Literature 2: Brochure of International Publication WO 2009/041442.

SUMMARY OF INVENTION

Technical Problem

In conventional flow passage switching valves, a pressure difference between flow passages localizes an area to be abraded on a sliding surface between a stator and a rotor. The same holds true for the flow passage switching valves described in Patent Literatures 1 and 2. An object of the present invention, which is made in light of such circumstances, is to provide a flow passage switching valve having a long operating life by dispersing an area abraded on a sliding surface between a stator and a rotor to the whole sliding surface.

Solution to Problem

One example of a flow passage switching valve according to the present invention includes a stator and a rotor configured to be rotatable with respect to the stator,
  where the stator includes a first stator flow passage, a second stator flow passage, and a third stator flow passage,
  the rotor includes a first rotor flow passage and a second rotor flow passage, and
  the flow passage switching valve achieves any one of a plurality of coupling patterns in correspondence to a rotation state of the rotor,
  the plurality of coupling patterns including
  a first coupling pattern where the first rotor flow passage couples the first stator flow passage to the second stator flow passage,
  a second coupling pattern where the first rotor flow passage couples the first stator flow passage to the third stator flow passage,
  a third coupling pattern where the second rotor flow passage couples the first stator flow passage to the second stator flow passage; and
  a fourth coupling pattern where the second rotor flow passage couples the first stator flow passage to the third stator flow passage.

The present disclosure covers the disclosure of Japanese patent application JP-2019-190312 as the basis for the right of priority of this application.

Advantageous Effects of Invention

According to the present invention, an area to be abraded on a sliding surface between a stator and a rotor is dispersed, making it possible to prolong the operating life of a flow passage switching valve.

BRIEF DESCRIPTION OF DRAWINGS

FIGS. 1A to 1D are diagrams illustrating an exemplary configuration of a flow passage switching valve according to First Embodiment of the present invention, in which
FIG. 1A is a cross-sectional view taken along the dashed line in FIG. 1D,
FIG. 1B is a top view of a rotor seal,
FIG. 1C is a top view of a portion where a stator contacts the rotor seal,
and FIG. 1D is a top view of a contact surface of the stator and the rotor seal.

FIGS. 3A and 3B are schematic diagrams of a flow passage of a liquid chromatograph according to First Embodiment of the present invention, in which FIG. 3A illustrates an initial state, and FIG. 3B illustrates a state where the flow passage switching valve is rotated clockwise from the initial state;

FIG. 6 is a diagram illustrating an operation according to a modification of First Embodiment;

FIGS. 7A to 7D are diagrams illustrating an exemplary configuration of a flow passage switching valve according to Second Embodiment of the present invention, in which FIG. 7A is a cross-sectional view of the flow passage switching valve, FIG. 7B is a top view of a rotor seal, FIG. 7C is a top view of a portion where a middle stator seal contacts the rotor seal, and FIG. 7D is a top view of a contact surface of the middle stator seal and the rotor seal.

DESCRIPTION OF EMBODIMENTS

Some embodiments of the present invention are now unlimitedly described with reference to the accompanying drawings.

First Embodiment

Figure 1A:
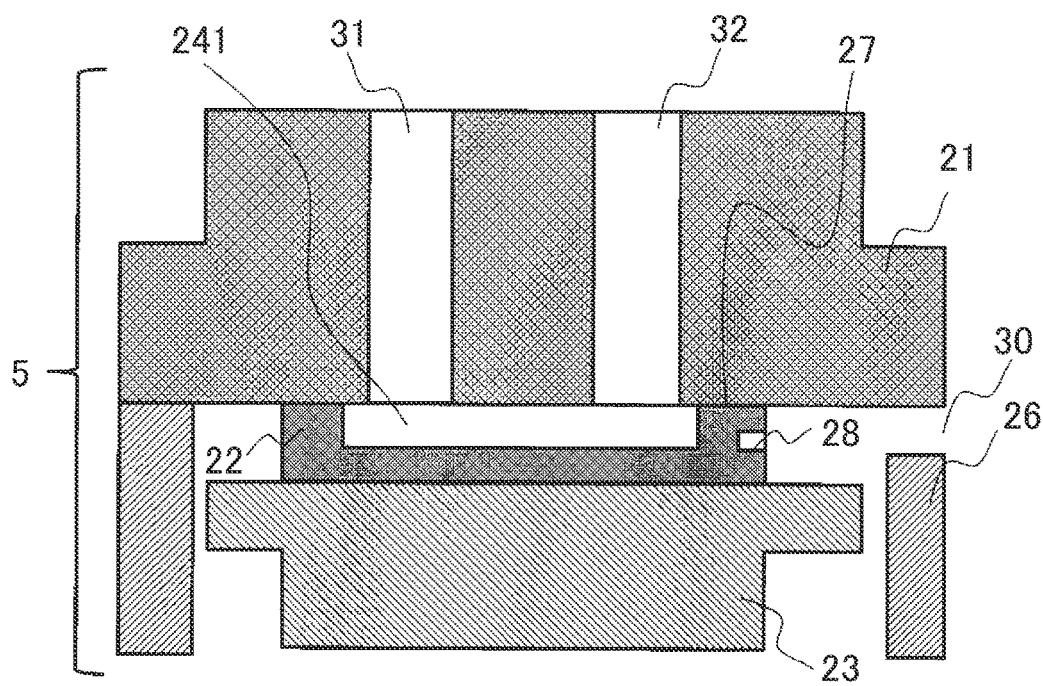
Figure 1B:
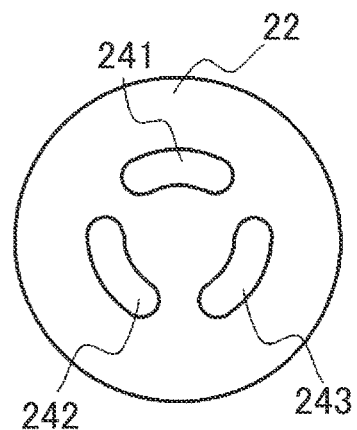
Figure 1C:
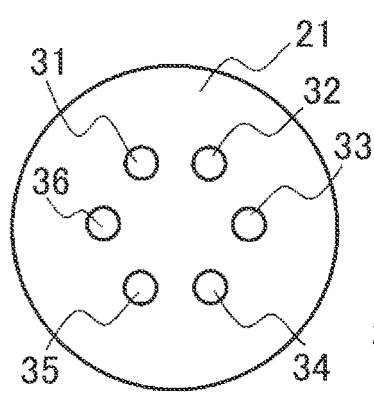
Figure 1D:
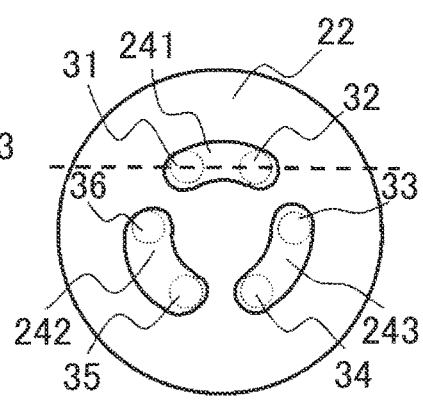

FIGS. 1A to 1D illustrate an exemplary configuration of a flow passage switching valve 5 of the invention. FIG. 1A shows a cross-sectional view as a plane parallel to an axis (for example, rotational axis, the same shall apply hereinafter) of the flow passage switching valve 5. FIG. 1A is taken along the dashed line in FIG. 1D. FIG. 1B shows a top view of a rotor seal 22, and FIG. 1C shows a top view of a portion of a stator main body 21 in contact with the rotor seal 22. Although the surface of the stator main body 21 shown in FIG. 1C is actually faces downward and cannot be seen from the above, FIG. 1C shows a shape of the surface as viewed from the above for ease in understanding of overlapping with the rotor seal 22. FIG. 1D shows a positional relationship between flow passages of the stator main body 21 and the rotor seal 22 when a contact surface of the stator main body 21 is set to overlap a contact surface of the rotor seal 22.

The flow passage switching valve 5 includes the stator and the rotor. The rotor is configured rotatably with respect to the stator, and rotates around a predetermined rotational axis, for example.

In this embodiment, as illustrated in FIG. 1A, the flow passage switching valve 5 includes the stator main body 21 for pipe connection, the rotor seal 22, a rotor main body 23 that rotates the rotor seal 22, and a housing 26 that holds the rotor seal 22 and the rotor main body 23. In this embodiment, the stator main body 21 configures the stator, and the rotor seal 22 and the rotor main body 23 collectively configure the rotor.

The rotor main body 23 is pressed to the stator main body 21 via the rotor seal 22 by a spring (not shown) or the like, and thus the rotor seal 22 is pressed to the stator main body 21. The stator main body 21 is made of, for example, metal or ceramic, and the rotor seal 22 is made of, for example, metal, ceramic, or resin. The stator main body 21 and the rotor seal 22 may each be coated with diamondlike carbon to improve abrasion resistance.

The stator main body 21 has a plurality of stationary stator flow passages that allow a fluid to flow through the inside of the stator main body 21. In this embodiment, as illustrated in FIG. 1C, the stator main body 21 has six stationary stator flow passages 31 to 36 that each configure a stator flow passage of this embodiment. In this embodiment, the stationary stator flow passage 31 is a first stator flow passage, the stationary stator flow passage 32 is a second stator flow passage, and the stationary stator flow passage 36 is a third stator flow passage.

The name "stator flow passage" represents that each flow passage is fixed to the stator main body 21 in this embodiment. Such representation is to clarify comparison with a configuration where a middle stator seal flow passage moves with respect to the stator main body as in Second Embodiment described later, and the representation does not mean in any sense that each flow passage is required to be fixed in another embodiment of the invention.

In this embodiment, the stationary stator flow passages 31 to 36 are provided on a circumference around an axis. In other words, distances from the axis of the stator main body 21 to the stationary stator flow passages 31 to 36 are equal to one another. In a possible modification, however, such distances may not be equal. In this embodiment, all cross sections perpendicular to the axis of the stationary stator flow passages 31 to 36 have the same shape and the same area. Specifically, in this embodiment, all the cross sections perpendicular to the axis of the stationary stator flow passages 31 to 36 have circular shapes having the same radius. In a possible modification, however, the cross sections may have different shapes or areas. In this embodiment, the stationary stator flow passages 31 to 36 are provided at even intervals in a circumferential direction. In other words, two adjacent stationary stator flow passages are disposed in respective directions defining an angle of 60° with respect to the axis. In a possible modification, however, the stationary stator flow passages may be provided at uneven intervals in a circumferential direction.

The rotor also has a plurality of rotor flow passages that allow a fluid to flow through the inside of the rotor. In this embodiment, as illustrated in FIG. 1B, the rotor seal 22 has three rotor flow passages 241 to 243. Specifically, in this embodiment, the rotor flow passage 241 is a first rotor flow passage, and the rotor flow passage 242 is a second rotor flow passage. In a possible modification, the rotor may not have the rotor seal 22. In such a case, the rotor flow passages may be provided in the rotor main body 23.

In this embodiment, the rotor flow passages 241 to 243 are provided on a circumference around an axis. In other words, the distances from the axis of the rotor seal 22 to the rotor flow passages 241 to 243 are equal to one another. In a possible modification, however, such distances may not be the same. In this embodiment, all cross sections perpendicular to the axis of the rotor flow passages 241 to 243 have the same shape and the same area. In a possible modification, however, the cross sections may have different shapes or areas. In this embodiment, the rotor flow passages 241 to 243 are provided at even intervals in a circumferential direction. In other words, two adjacent rotor flow passages define an angle of 120° with respect to the axis. In a possible modification, however, the stationary stator flow passages may be provided at uneven intervals in a circumferential direction.

Each rotor flow passage is configured to be allowed to couple the two stationary stator flow passages together in correspondence to a rotation state of the rotor. The rotation state of the rotor shows a rotational positional relationship between the stator and the rotor, for example. More specifically, when a reference rotational position of the rotor seal 22 is defined with respect to the stator main body 21, the rotor rotation state may be defined as a relative rotational position of the rotor seal 22 with respect to the reference rotational position. For example, in the state shown in FIGS. 1A and 1D, the rotor flow passage 241 couples the stationary stator flow passages 31 and 32 together, the rotor flow passage 242 couples the stationary stator flow passages 35 and 36 together, and the rotor flow passage 243 couples the stationary stator flow passages 33 and 34 together.

As described above, the rotor seal 22 is pressed to the stator main body 21 by the rotor main body 23 to maintain fluid-tightness. Specifically, no liquid is leaked from one of flow passages, i.e., a flow passage including the rotor flow passage 241 connected to the respective stationary stator flow passages 31 and 32, a flow passage including the rotor flow passage 242 connected to the respective stationary stator flow passages 35 and 36, and a flow passage including the rotor flow passage 243 connected to the respective stationary stator flow passages 33 and 34, to another one of the flow passages, or to the outside of the flow passage switching valve 5.

The rotor seal 22 is fixed to the rotor main body 23 by a pin or the like (not shown), and rotates with the rotor main body 23 by a motor (not shown) coupled to the rotor main body 23. A rotation angle of the rotor is measured by, for example, an encoder provided in the motor. Alternatively, for example, the rotation angle can be measured by optically detecting a position detection groove 28 provided in the rotor seal 22 from the outside through a position detection window 30 provided in the housing 26. At this time, a plurality of position detection grooves 28 or position detection windows 30 may be provided.

Figure 2A:
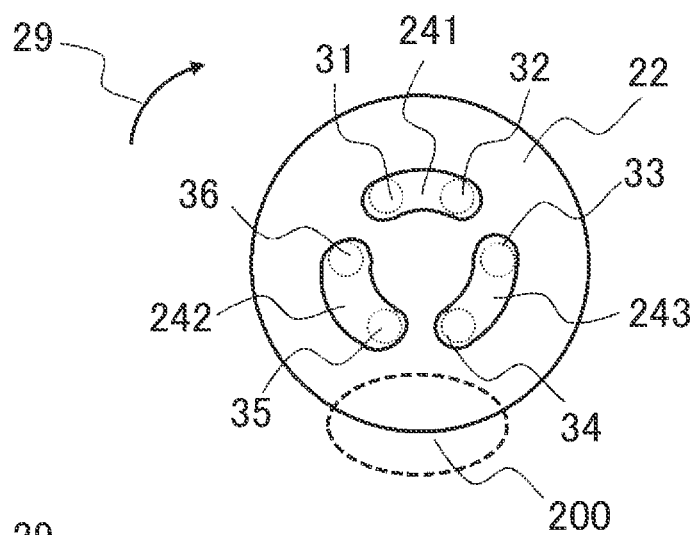
FIGS. 2A to 2C are explanatory views of operation description and abrasion areas of a conventional flow passage switching valve.
Figure 2B:
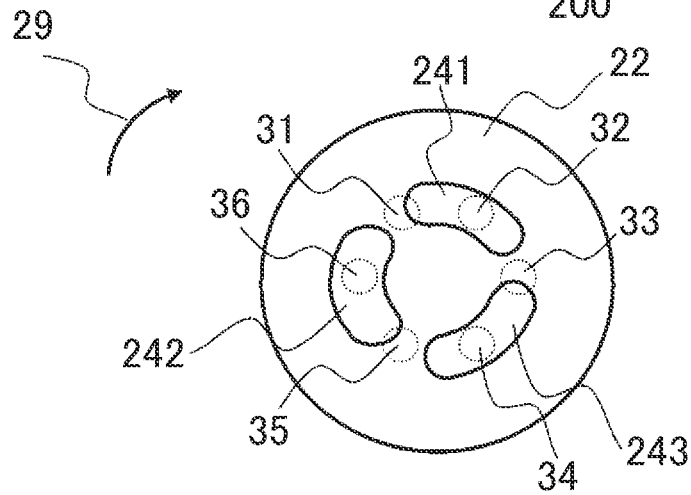
Figure 2C:
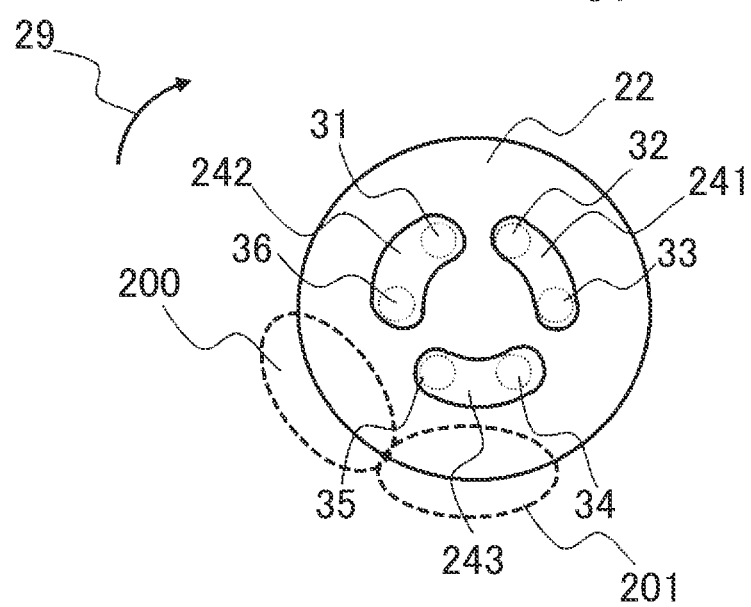

A conventional flow passage switching valve is described using FIGS. 2A to 2C. In a state of FIG. 2A, the rotor seal 22 rotates 60° in a sliding direction 29 (clockwise), so that a state of FIG. 2C is given via a state of FIG. 2B. The rotor flow passage 241 connects the stationary stator flow passages 31 and 32 together in the state of FIG. 2A, and connects the stationary stator flow passages 32 and 33 together in the state of FIG. 2C. Similarly, the rotor flow passage 242 connects the stationary stator flow passages 35 and 36 together in the state of FIG. 2A, and connects the stationary stator flow passages 36 and 31 together in the state of FIG. 2C. The rotor flow passage 243 connects the stationary stator flow passages 33 and 34 together in the state of FIG. 2A, and connects the stationary stator flow passages 34 and 35 together in the state of FIG. 2C. After the state has been changed from the state of FIG. 2A to the state of FIG. 2C, the rotor seal 22 in the state of FIG. 2C rotates 60° in a direction opposite to the sliding direction 29, so that the state returns to the state of FIG. 2A via the state of FIG. 2B. In this way, the rotor seal 22 performs a reciprocation motion including 60-degree rotation in the sliding direction 29 and 60-degree rotation in the direction opposite to the sliding direction 29 (counterclockwise).

The rotational direction and the rotational amount are specifically shown for convenience in this description and actually need not be matched with the described direction and amount, respectively. For example, the 60-degree rotation in the sliding direction 29 can also be achieved by 420-degree rotation in the sliding direction 29, or 300-degree rotation in the direction opposite to the sliding direction 29.

Figure 3A:
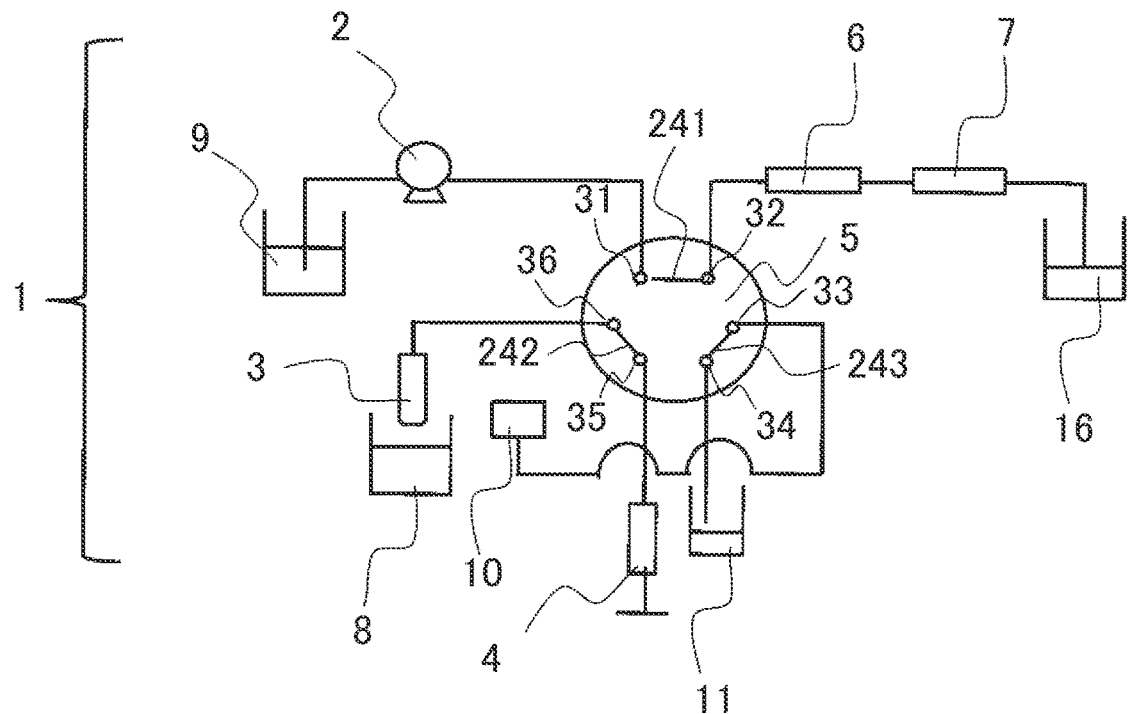
Figure 3B:
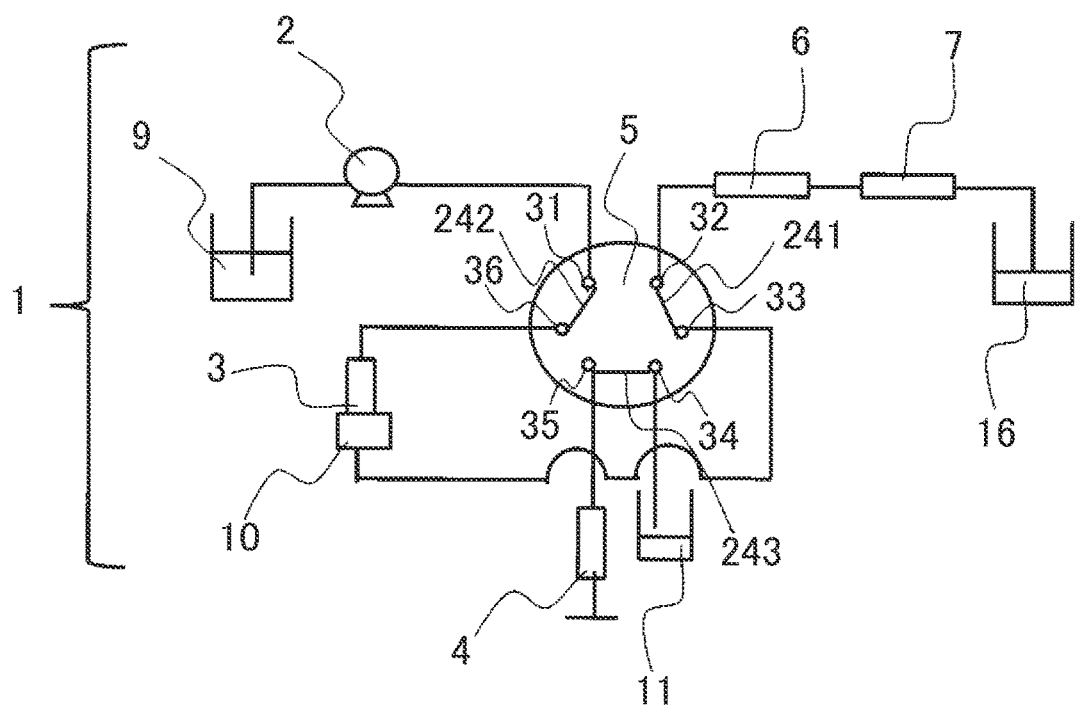

FIGS. 3A and 3B are each a schematic diagram of a flow passage of a liquid chromatograph 1 according to First Embodiment of the invention. FIGS. 3A and 3B each show a schematic diagram of the flow passage of the liquid chromatograph 1 having a flow passage switching valve 5 of First Embodiment of the invention. The liquid chromatograph 1 includes a liquid sending pump 2, a needle 3, a syringe pump 4, the flow passage switching valve 5, a separation column 6, a detector 7, and pipes for coupling such components together. The stationary stator flow passages 31, 32, 33, 34, 35, and 36 of the flow passage switching valve 5 are coupled to the liquid sending pump 2, the separation column 6, a needle port 10, a waste liquid tank 11, the syringe pump 4, and the needle 3, respectively.

First, in a state of FIG. 3A, an eluent 9 sent by the liquid sending pump 2 flows to the separation column 6, the detector 7, and a waste liquid tank 16 through the stationary stator flow passage 31, the rotor flow passage 241, and the stationary stator flow passage 32. The needle port 10 is coupled to the waste liquid tank 11 via the stationary stator flow passage 33, the rotor flow passage 243, and the stationary stator flow passage 34, and the syringe pump 4 is coupled to the needle 3 via the stationary stator flow passage 35, the rotor flow passage 242, and the stationary stator flow passage 36. In this state, the syringe pump 4 performs sucking operation so that a sample 8 is sucked into the needle 3.

Subsequently, the rotor seal 22 is rotated 60° in the sliding direction 29 (clockwise) to switch a flow passage, so that the state of FIG. 3B is given. In the state of FIG. 3B, the needle 3 holding the sample 8 is moved and coupled to the needle port 10. In such a state, the eluent is sent by the liquid sending pump 2 to send the sample 8 in the needle 3 to the separation column 6, the sample 8 is separated by the separation column 6, and the separated sample is detected by the detector 7. Subsequently, the eluent is sent to wash the flow passage through which the sample has flown.

In the conventional flow passage switching valve, the rotor seal 22 in the state of FIG. 3B is rotated 60° in the direction opposite to the sliding direction 29 (counterclockwise), so that the state is returned to the state of FIG. 3A. In such a state, the eluent is flown by the liquid sending pump 2 and the syringe pump 4 to wash the flow passage. The above operation is repeated for each sample to be analyzed.

The separation column 6 is internally filled with particles several micrometers in size and has a large fluid resistance. Thus, the liquid sending pump 2 sends the eluent at a high pressure of tens of megapascal (MPa). On the other hand, since the flow passage led to the syringe pump 4 is not coupled to a component having a large fluid resistance, liquid sending pressure of the syringe pump 4 is close to atmospheric pressure (0.1 MPa). In the state of FIG. 3A, therefore, liquid pressure is high in the rotor flow passage 241 but low in each of the rotor flow passages 242 and 243. As a result, the rotor seal 22 and the stator main body 21 are spread by the high liquid pressure and thus contact pressure is reduced in the vicinity of the rotor flow passage 241. On the other hand, liquid pressure is small and thus contact pressure is large in the vicinity of each of the rotor flow passages 242 and 243 compared with in the vicinity of the rotor flow passage 241. Consequently, an area 200 shown in FIG. 2A has an increased contact pressure in the whole contact surface of the rotor seal 22.

On the other hand, in the state of FIG. 3B, liquid pressure is high in each of the rotor flow passages 242 and 241 but low in the rotor flow passage 243. As a result, the rotor seal 22 and the stator main body 21 are spread by the high liquid pressure and thus contact pressure is reduced in the vicinity of each of the rotor flow passages 242 and 241. On the other hand, liquid pressure is small and thus contact pressure is large in the vicinity of the rotor flow passages 243 compared with in the vicinity of each of the rotor flow passages 242 and 241. Consequently, an area 201 shown in FIG. 2C has an increased contact pressure in the whole contact surface of the rotor seal 22. A position of the area 200 moves with rotation of the rotor seal 22.

As described above, in the conventional flow passage switching valve, since the rotor seal 22 performs a reciprocation motion between the state of FIG. 3A (FIG. 2A) and the state of FIG. 3B (FIG. 2C), only each of the areas 200 and 201 has a high contact pressure in the contact surface of the rotor seal 22 with the stator main body 21, and abrasion of such a portion progresses more quickly than other portions. As a result, an area abrased on the sliding surface is localized, leading to a reduction in operating life of the flow passage switching valve.

Figure 4:
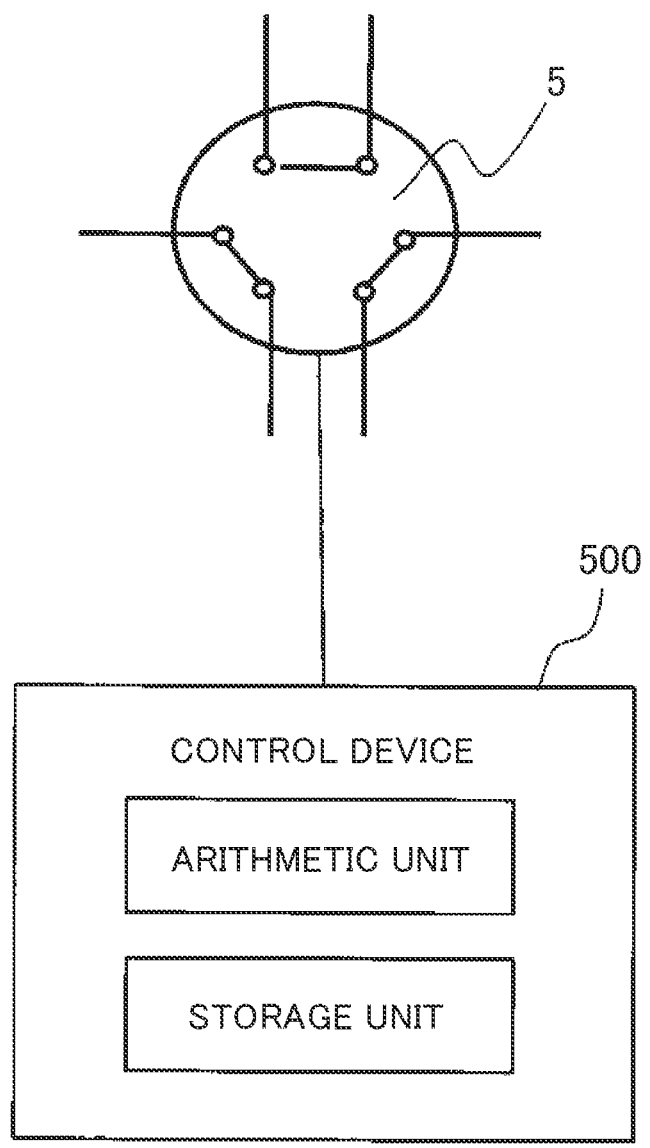
FIG. 4 is a diagram illustrating an exemplary configuration of a flow passage switching valve system according to First Embodiment of the present invention.

FIG. 4 illustrates an exemplary configuration of a flow passage switching valve system including the flow passage switching valve 5 according to First Embodiment of the invention. The flow passage switching valve system includes the flow passage switching valve 5 and a control device 500 that controls rotation of a rotor of the flow passage switching valve 5. The control device 500 can be configured using, for example, a computer having a known configuration, and includes a calculation unit performing calculation and a storage unit storing information. The calculation unit includes, for example, a processor, and the storage unit includes, for example, a semiconductor memory. The storage unit can store a program and the calculation unit executes the program, through which the control device 500 implements such processing and controls the flow passage switching valve 5.

FIG. 5 is used to describe an operation of the flow passage switching valve 5 according to First Embodiment of the invention and describe an abrasion area. In this embodiment, the flow passage switching valve 5 switches a flow passage by continuously rotating the rotor seal 22 in the same direction, and thus the operating life of the valve is prolonged.

The flow passage switching valve 5 achieves a plurality of coupling patterns in a switchable manner, and specifically achieves any one of the coupling patterns in correspondence to rotation of the rotor. In this embodiment, six coupling patterns shown in FIG. 5 can be achieved. In this embodiment, a pattern shown in FIG. 5A is a first coupling pattern, a pattern shown in FIG. 5F is a second coupling pattern, a pattern shown in FIG. 5C is a third coupling pattern, and a pattern shown in FIG. 5B is a fourth coupling pattern.

In the following description, respective positions of the stationary stator flow passages 31 to 36 of FIGS. 5A to 5F correspond to the positions shown in FIG. 3A or 3B.

Figure 5A:
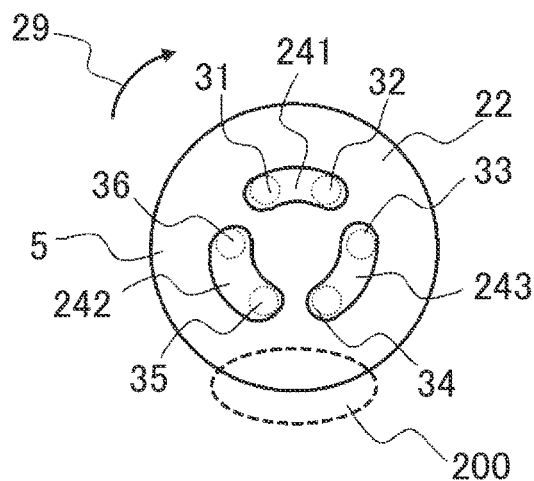
FIGS. 5A to 5F are explanatory views of operation description and abrasion areas of the flow passage switching valve of First Embodiment of the present invention.
Figure 5D:
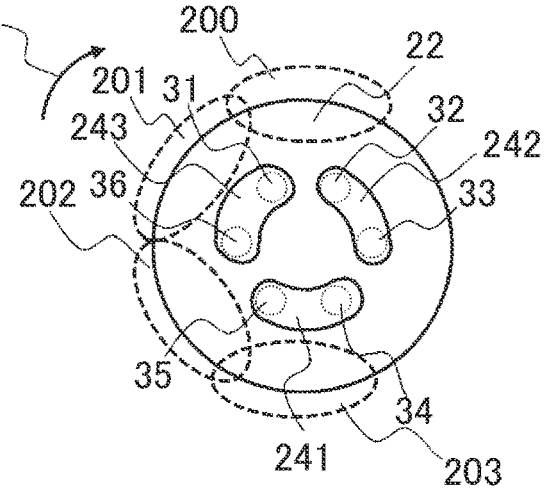

In the coupling pattern of FIG. 5A, the rotor flow passage 241 couples the stationary stator flow passages 31 and 32 together, the rotor flow passage 242 couples the stationary stator flow passages 35 and 36 together, and the rotor flow passage 243 couples the stationary stator flow passages 33 and 34 together. As known from the above-described relationship between the liquid pressure and the contact pressure, contact pressure is high in the vicinity of the area 200 of the rotor seal 22 in FIG. 5A.

Figure 5B:
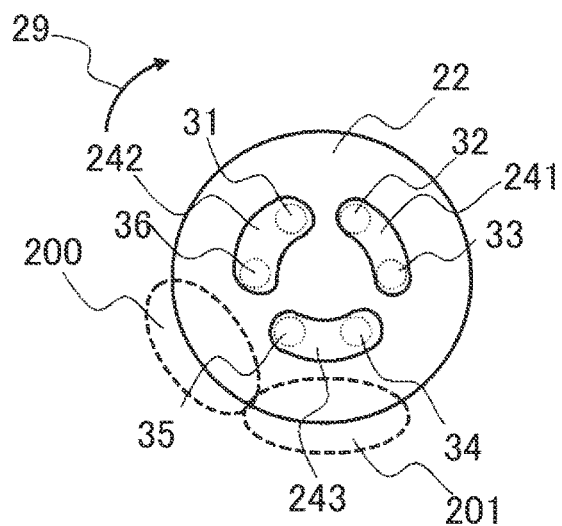

Subsequently, the rotor seal 22 is rotated 60° in the sliding direction 29, so that a state of FIG. 5B is given. In the coupling pattern of FIG. 5B, the rotor flow passage 241 couples the stationary stator flow passages 32 and 33 together, the rotor flow passage 242 couples the stationary stator flow passages 36 and 31 together, and the rotor flow passage 243 couples the stationary stator flow passages 34 and 35 together. In such a state, contact pressure is high in the vicinity of the area 201 on the rotor seal 22.

Subsequently, the rotor seal 22 is further rotated 60° in the sliding direction 29, so that a state of FIG. 5C is given. In the coupling pattern of FIG. 5C, the rotor flow passage 241 couples the stationary stator flow passages 33 and 34 together, the rotor flow passage 242 couples the stationary stator flow passages 31 and 32 together, and the rotor flow passage 243 couples the stationary stator flow passages 35 and 36 together. In such a state, contact pressure is high in the vicinity of the area 202 on the rotor seal 22. At this time, the area 200 on the rotor seal 22 does not return to the original position but moves to a position rotated 120° in the sliding direction 29, i.e., moves to the upper left position in FIG. 5C.

Subsequently, the rotor seal 22 is further rotated 60° in the sliding direction 29, so that a state of FIG. 5D is given. In the coupling pattern of FIG. 5D, the rotor flow passage 241 couples the stationary stator flow passages 34 and 35 together, the rotor flow passage 242 couples the stationary stator flow passages 32 and 33 together, and the rotor flow passage 243 couples the stationary stator flow passages 36 and 31 together.

Figure 5E:
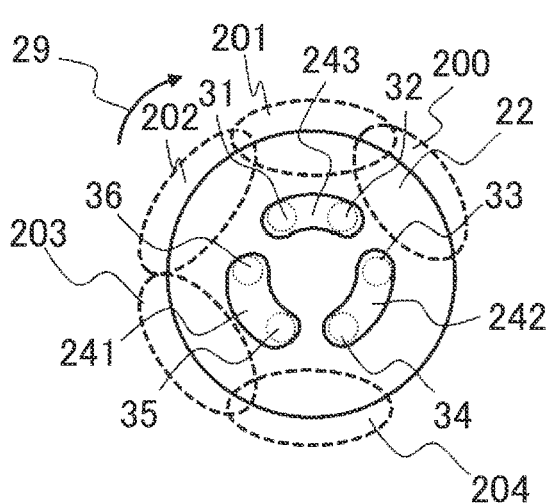
Figure 5C:
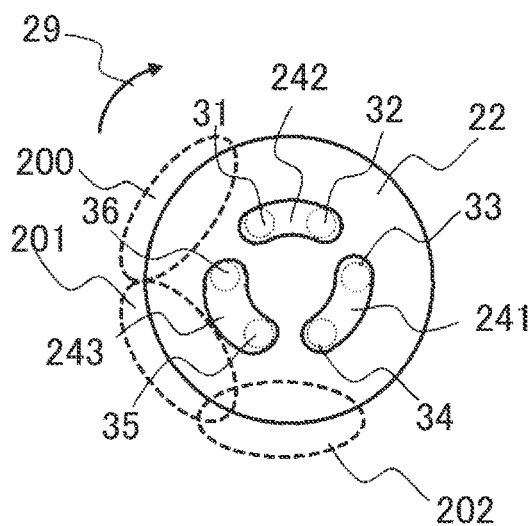
Figure 5F:
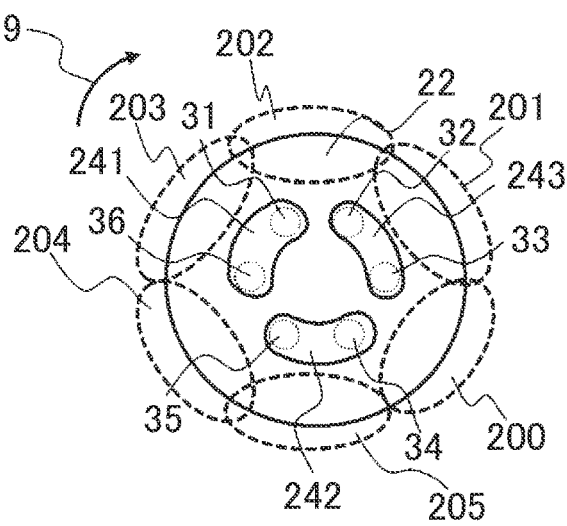

Subsequently, the rotor seal 22 is further rotated 60° in the sliding direction 29, so that a state of FIG. 5E is given. In the coupling pattern of FIG. 5E, the rotor flow passage 241 couples the stationary stator flow passages 35 and 36 together, the rotor flow passage 242 couples the stationary stator flow passages 33 and 34 together, and the rotor flow passage 243 couples the stationary stator flow passages 31 and 32 together.

Subsequently, the rotor seal 22 is further rotated 60° in the sliding direction 29, so that a state of FIG. 5F is given. In the coupling pattern of FIG. 5F, the rotor flow passage 241 couples the stationary stator flow passages 36 and 31 together, the rotor flow passage 242 couples the stationary stator flow passages 34 and 35 together, and the rotor flow passage 243 couples the stationary stator flow passages 32 and 33 together.

Subsequently, the rotor seal 22 is further rotated 60° in the sliding direction 29, so that the state of FIG. 5A is given again. Thus, when the rotor seal 22 is constantly switched at 60-degree intervals in the sliding direction 29 in flow passage switching, the areas 200 to 206 that have experienced the state of high contact surface pressure are dispersed around the entire circumference on the rotor seal 22. This disperses the abrasion area of the rotor seal 22, leading to a long operating life compared with a case using a conventional drive method.

To disperse the abrasion area around the entire circumference on the rotor seal 22, the rotor seal 22 does not necessarily need to be constantly rotated in the same direction as in First Embodiment. In a possible modification, the rotor seal 22 may be rotated in the opposite direction according to a condition.

FIG. 6 illustrates an exemplary operation according to such a modification. In this example, the control device 500 can operate in any one of a plurality of modes. For example, the control device 500 can operate in any one of modes, including a mode in which the coupling pattern of FIG. 5A and the coupling pattern of FIG. 5B are alternately achieved (first mode), a mode in which the coupling pattern of FIG. 5C and the coupling pattern of FIG. 5D are alternately achieved (second mode), and a mode in which the coupling pattern of FIG. 5E and the coupling pattern of FIG. 5F are alternately achieved (third mode).

For example, the control device 500 operates in the first mode and the rotor seal 22 performs a reciprocating motion between the states of FIGS. 5A and 5B until a predetermined criterion is satisfied. Subsequently, when the predetermined criterion is satisfied, the rotor seal 22 is rotated 120° only once so that the mode is shifted to the second mode (for example, the state of FIG. 5C is given). The control device 500 then operates in the second mode and the rotor seal 22 performs a reciprocating motion between the states of FIGS. 5C and 5D until the predetermined criterion is satisfied again. Subsequently, when the predetermined criterion is satisfied again, the rotor seal 22 is rotated 120° only once so that the mode is shifted to the third mode (for example, the state of FIG. 5E is given). The control device 500 then operates in the third mode and the rotor seal 22 performs a reciprocating motion between the states of FIGS. 5E and 5F until the predetermined criterion is satisfied again. When the predetermined criterion is further satisfied, the rotor seal 22 is rotated 120° only once so that the mode is returned to the first mode (for example, the state is returned to the state of FIG. 5A). Such an operation can also disperse the abrasion area around the entire circumference on the rotor seal 22.

Each mode may include not only the above combination of the states but another combination of the states. For example, the first mode may include the states of FIGS. 5F and 5A, the second mode may include the states of FIGS. 5B and 5C, and the third mode may include the states of FIGS. 5D and 5E.

The predetermined criterion for shifting the mode can be optionally designed. For example, the control device 500 may switch the mode based on the total rotation amount of the rotor. The total rotation amount refers to, for example, the number of rotations of the rotor seal 22 (or an integrated value of angles) up to that time. Alternatively, the control device 500 may switch the mode based on the total rotation time of the rotor. The total rotation time refers to, for example, an integrated value of time, during which the rotor seal 22 has performed the rotational operation, up to that time. Alternatively, the control device 500 may switch the mode based on the total operation time of the flow passage valve system. The total operation time refers to, for example, an integrated value of time, during which the flow passage valve system has been on, up to that time. Alternatively, the control device 500 may switch the mode based on fluid passing frequency in any one of the flow passages (i.e., any one of the stationary stator flow passages 31 to 36 and the rotor flow passages 241 to 243). The fluid passing frequency corresponds to execution frequency of analysis operation in the liquid chromatograph 1.

Alternatively, the liquid chromatograph 1 may include a device that measures a state of a fluid in any one flow passage, and the control device 500 may receive a signal from such a device and switch a mode based on the signal. For example, the control device 500 may switch the mode based on pressure in any one flow passage, based on the amount of change in pressure in any one flow passage, based on the total flow rate (for example, the total amount of the eluent) in any one flow passage, based on the leakage amount from any one flow passage, based on a change in the leakage amount from any one flow passage, or based on the carry-over amount in any one flow passage. The carry-over amount can be detected using the detector 7 by a predetermined analysis method, for example.

A condition, which is defined by combining at least two or all of the above-described criteria, may be used. Predefining such a criterion makes it possible to switch the mode at an appropriate timing and disperse the abrasion area more appropriately.

Second Embodiment

In First Embodiment, the structure on the stator side of the sliding surface is fixed at any time. In Second Embodiment, the structure on the stator side of the sliding surface is partially rotatable. Differences from First Embodiment are now described.

FIGS. 7A to 7D illustrate an exemplary configuration of a flow passage switching valve 5 according to Second Embodiment of the invention. Second Embodiment differs from First Embodiment in that a middle stator seal 330 is provided between the stator main body 21 and the rotor seal 22 as shown in FIGS. 7A to 7D. In Second Embodiment, the stator main body 21 and the middle stator seal 330 collectively configure the stator.

Figure 7A:
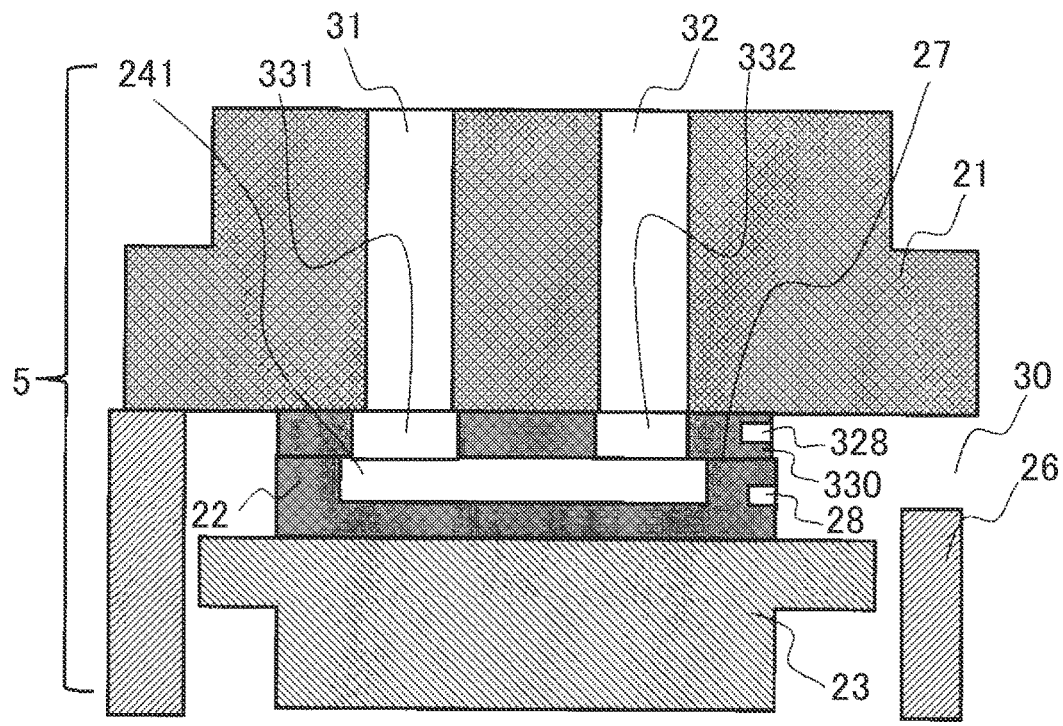
Figure 7B:
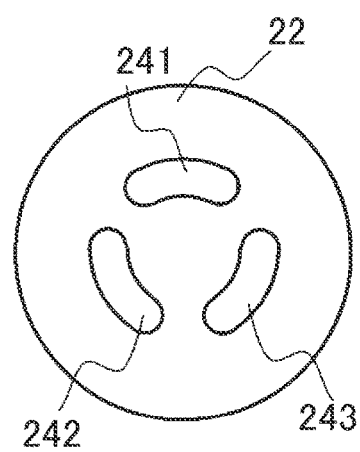
Figure 7C:
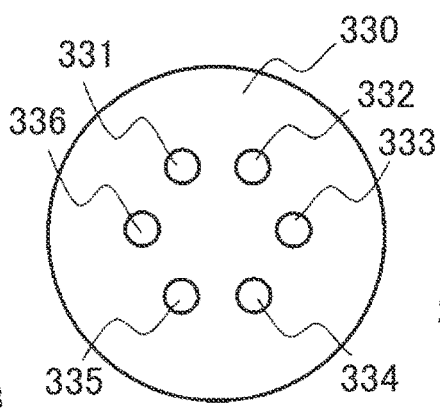
Figure 7D:
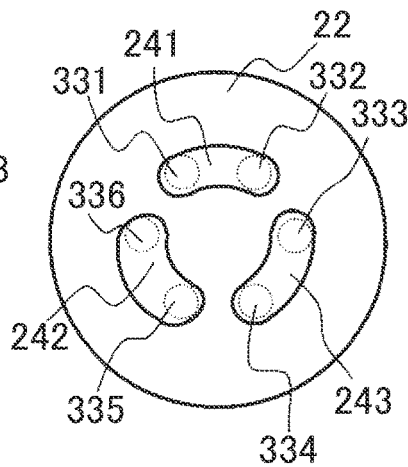

FIG. 7A shows a cross-sectional view as a plane parallel to an axis of the flow passage switching valve 5, FIG. 7B shows a top view of the rotor seal 22, and FIG. 7C shows a top view of a portion of the middle stator seal 330 in contact with the rotor seal 22. Although the surface of the middle stator seal 330 shown in FIG. 7C is actually faces downward and cannot be seen from the above, FIG. 7C shows a shape of the surface as viewed from the above for ease in understanding of overlapping with the rotor seal 22. FIG. 7D shows a positional relationship between each flow passage of the middle stator seal 330 and the rotor seal 22 when a contact surface of the middle stator seal 330 is set to overlap a contact surface of the rotor seal 22.

A liquid chromatograph having a flow passage switching valve 5 of Second Embodiment of the invention is described with FIGS. 3A and 3B, FIGS. 7A to 7D, and FIGS. 8A to 8C. The middle stator seal 330 is rotatably fixed to the stator main body 21. The rotational axis of the middle stator seal 330 is the same as the rotational axis of the rotor. The middle stator seal 330 is rotated with respect to the stator main body 21, thereby an abrasion area on the contact surface can be dispersed not only on a rotor side but also on a stator side.

The middle stator seal 330 has middle stator seal flow passages 331 to 336 that are each coupled to any one of the stationary stator flow passages 31 to 36. A particular middle stator seal flow passage and a particular stationary stator flow passage to be coupled together are each different depending on a rotational position of the middle stator seal 330 with respect to the stator main body 21. The middle stator seal flow passages 331 to 336 each configure a stator flow passage of this embodiment.

As illustrated in FIGS. 7A to 7D, the rotor seal 22 of the flow passage switching valve 5 of Second Embodiment is pressed to the middle stator seal 330 by the rotor main body 23, which maintains fluid-tightness of each of the three flow passages. In the state shown in FIGS. 7A to 7D, the three flow passages include a flow passage configured of the rotor flow passage 241, the stationary stator flow passages 31 and 32, and the middle stator seal flow passages 331 and 332 (FIG. 7A shows such a flow passage), a flow passage configured of the rotor flow passage 242, the stationary stator flow passages 35 and 36, and the middle stator seal flow passages 335 and 336, and a flow passage configured of the rotor flow passage 243, the stationary stator flow passages 33 and 34, and the middle stator seal flow passages 333 and 334.

The rotor seal 22 is fixed to the rotor main body 23 by a pin (not shown), and rotates by a motor (not shown) coupled to the rotor main body 23.

Figure 8A:
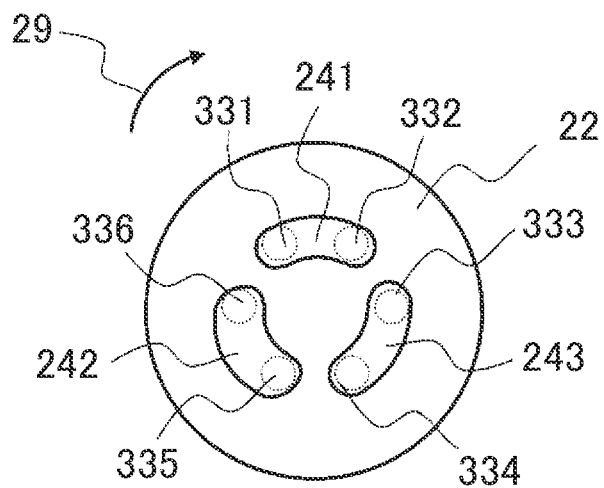
FIGS. 8A to 8C are explanatory views of an operation method of the flow passage switching valve of Second Embodiment of the present invention.
Figure 8B:
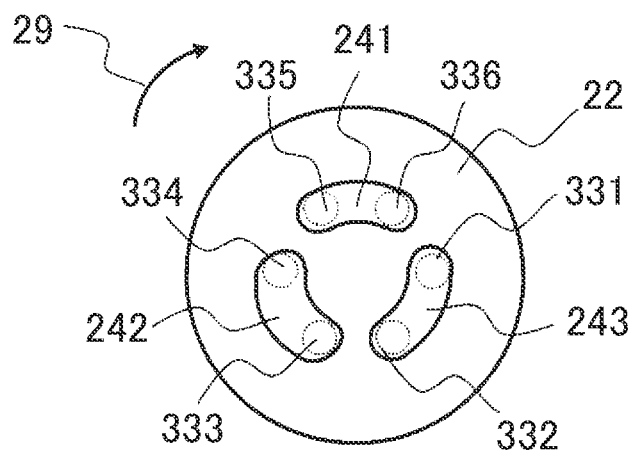
Figure 8C:
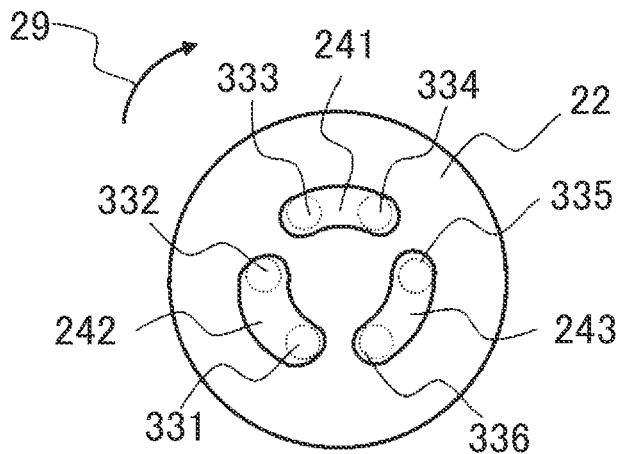

FIGS. 8A to 8C illustrate an operation method of the flow passage switching valve 5 according to Second Embodiment. The state of FIG. 8A shows one of coupling patterns achieved in the first mode, which corresponds to the state of FIGS. 7A to 7D. The flow passage switching valve 5 operates while switching between two coupling patterns including the coupling pattern of FIG. 8A. For example, the coupling pattern of FIG. 8A and a coupling pattern in a state, which is given by rotating the rotor in the state of FIG. 8A by 60° in the sliding direction 29, are achieved while being switched to each other.

When the middle stator seal 330 in the state of FIG. 8A is rotated 120° in the sliding direction 29, a state of FIG. 8B is given. The state of FIG. 8B shows one of coupling patterns achieved in the second mode. The flow passage switching valve 5 operates while switching between two coupling patterns including the coupling pattern of FIG. 8B. For example, the coupling pattern of FIG. 8B and a coupling pattern in a state, which is given by rotating the rotor in the state of FIG. 8B by 60° in the sliding direction 29, are achieved while being switched to each other.

In the state of FIG. 8B, the middle stator seal flow passage 335, the rotor flow passage 241, and the middle stator seal flow passage 336 are each coupled to the liquid sending pump 2 and the separation column 6 in FIGS. 3A and 3B. The middle stator seal flow passage 331, the rotor flow passage 243, and the middle stator seal flow passage 332 are each coupled to the needle port 10 and the waste liquid tank 11. The middle stator seal flow passage 333, the rotor flow passage 242, and the middle stator seal flow passage 334 are each coupled to the needle 3 and the syringe pump 4 in FIGS. 3A and 3B.

When the middle stator seal 330 in the state of FIG. 8A is rotated 240° in the sliding direction 29 (when the middle stator seal 330 in the state of FIG. 8B is rotated 120° in the sliding direction 29), a state of FIG. 8C is given. The state of FIG. 8C shows one of the coupling patterns achieved in the third mode. The flow passage switching valve 5 operates while switching between two coupling patterns including the coupling pattern of FIG. 8C. For example, the coupling pattern of FIG. 8C and a coupling pattern in a state, which is given by rotating the rotor in the state of FIG. 8C by 60° in the sliding direction 29, are achieved while being switched to each other.

In the state of FIG. 8C, the middle stator seal flow passage 333, the rotor flow passage 241, and the middle stator seal flow passage 334 are each coupled to the liquid sending pump 2 and the separation column 6 in FIGS. 3A and 3B. The middle stator seal flow passage 335, the rotor flow passage 243, and the middle stator seal flow passage 336 are each coupled to the needle port 10 and the waste liquid tank 11. The middle stator seal flow passage 331, the rotor flow passage 242, and the middle stator seal flow passage 332 are each coupled to the needle 3 and the syringe pump 4 in FIGS. 3A and 3B.

A method and a configuration for rotating the middle stator seal 330 can be optionally designed by those skilled in the art. For example, the middle stator seal 330 may be manually rotated by a user of a liquid chromatograph or may be automatically rotated by the control device 500 or another device. In a possible configuration in case of the manual rotation, for example, a tool (not shown) is inserted into a rotation groove 328 of the middle stator seal 330 through the position detection window 30 in FIGS. 7A to 7D to rotate the middle stator seal 330. For example, an axially protruding convex portion (not shown) is provided in the center of rotation of the middle stator seal 330, an axially depressed concave portion (not shown) is provided in the center of the stator main body 21, and such convex and concave portions are physically combined and rotatably engaged together, thereby a rotational axis of the middle stator seal can be configured. A structure (such as a locking mechanism) that fix and hold the middle stator seal 330 to the stator main body 21 may be provided to prevent corotation of the middle stator seal 330 during rotation of the rotor seal 22.

Such rotation of the middle stator seal 330 achieves, in a more balanced manner, a state of high liquid pressure of each of the middle stator seal flow passages 331 and 332, a state of high liquid pressure of each of the middle stator seal flow passages 333 and 334, and a state of high liquid pressure of each of the middle stator seal flow passages 335 and 336. For example, the rotation achieves, in a more balanced manner, a state of high contact pressure of an area opposed to the middle stator seal flow passages 331 and 332, a state of high contact pressure of an area opposed to the middle stator seal flow passages 333 and 334, and a state of high contact pressure of an area opposed to the middle stator seal flow passages 335 and 336. As a result, an abrasion area of the middle stator seal 330 is dispersed, leading to a long operating life compared with a case using a conventional drive method.

The timing for rotating the middle stator seal 330 can be determined based on a criterion similar to the criterion for timing to switch the mode as described in the modification shown in FIG. 6. The mode switching of rotor rotation as in FIG. 6 and the mode switching of rotation of the middle stator seal 330 according to Second Embodiment may be performed in a combined manner. When such mode switching operations are performed in a combined manner, both switching timings are preferably designed so as not to coincide with each other to avoid a fixed positional relationship between the rotor seal 22 and the middle stator seal 330.

Other Modifications

In the described First and Second Embodiments, the number of the flow passages or the coupling patterns may be appropriately changed depending on applications of the flow passage switching valve. At least three stator flow passages (stationary stator flow passages in First Embodiment, middle stator flow passages in Second Embodiment), at least two rotor flow passages, and at least four coupling patterns may be provided. For example, in case of a flow passage configuration having stator flow passages including only the stationary stator flow passages 31, 32, and 36 as shown in FIGS. 5A to 5F and rotor flow passages including only the rotor flow passages 241 and 242 as shown in FIGS. 5A to 5F, at least four coupling patterns corresponding to FIGS. 5A to 5D may be achieved. In such a case, each rotor flow passage need not necessarily be configured to couple two stator flow passages together in any of the coupling patterns (for example, in the pattern of FIG. 5A, when the stationary stator flow passages 33 to 35 do not exist, the rotor flow passage 242 is in communication with only the stationary stator flow passage 36 without coupling two stator flow passages together).

All the structurally achievable coupling patterns need not necessarily be evenly achieved. For example, in the example of FIG. 6, the control device 500 may operate only in the first and second modes without the third mode while switching between the first and second modes. In such a case, although the coupling patterns of FIGS. 5E and 5F are not achieved, the abrasion area can also be dispersed in some degree (not around the entire circumference but in two or more points).

Although three modes are defined in the example of FIG. 6, the number of modes may be at least two. For example, the number of modes may be two so that two coupling patterns are alternately achieved in the first mode while other two coupling patterns are alternately achieved in the second mode. For the example of FIGS. 5A to 5F, the coupling pattern of FIG. 5A and one of the coupling patterns of FIGS. 5B and 5F may be alternately achieved in the first mode, and two specific coupling patterns, which are not achieved in the first mode, may be achieved in the second mode. The above "two specific coupling patterns that are not achieved in the first mode" includes the coupling pattern of FIG. 5C and another coupling pattern. The above "another coupling pattern" includes, for example, one of the coupling patterns of FIGS. 5B and 5F, which is not achieved in the first mode, but may be the coupling pattern of FIG. 5D or an appropriately configured coupling pattern other than such coupling patterns.

LIST OF REFERENCE SIGNS 1 liquid chromatograph
2 liquid sending pump
3 needle
4 syringe pump
5 flow passage switching valve
6 separation column
7 detector
8 sample
9 eluent
10 needle port
11, 16 waste liquid tank
21 stator main body (stator)
22 rotor seal (rotor)
23 rotor main body (rotor)
26 housing
28 position detection groove
29 sliding direction
30 position detection window
31 stationary stator flow passage (first stator flow passage)
32 stationary stator flow passage (second stator flow passage)
33, 34, 35 stationary stator flow passage
36 stationary stator flow passage (third stator flow passage)
200, 201, 202 area
241 rotor flow passage (first rotor flow passage)
242 rotor flow passage (second rotor flow passage)
243 rotor flow passage
328 rotation groove
330 middle stator seal
331 middle stator seal flow passage (first stator flow passage)
332 middle stator seal flow passage (second stator flow passage)
333, 334, 335 middle stator seal flow passage
336 middle stator seal flow passage (third stator flow passage)
500 control device All references, including publications, patents, and patent applications, cited herein are incorporated herein by reference.

What is claimed is:

1. A flow passage switching valve for a liquid chromatograph system comprising:
   a stator;
   a rotor configured to be rotatable with respect to the stator; and
   a control device that controls a rotation of the rotor,
   wherein the flow passage switching valve is characterized in that the stator includes a first stator flow passage, a second stator flow passage, and a third stator flow passage, wherein distances from an axis of a stator main body to the first, second and third stator flow passages are equal to another,
   wherein the rotor includes a plurality of rotor flow passages that are each circumferentially disposed, including a first rotor flow passage and a second rotor flow passage, wherein distances from an axis of a rotor seal of the rotor to the first and the second rotor flow passage are equal to one another,
   wherein the flow passage switching valve is configured to achieve any of a plurality of coupling patterns corresponding to a rotation state of the rotor,
   the plurality of coupling patterns including:
     a first coupling pattern where the first rotor flow passage couples the first stator flow passage and the second stator flow passage;
     a second coupling pattern where the first rotor flow passage couples the first stator flow passage and the third stator flow passage;
     a third coupling pattern where the second rotor flow passage couples the first stator flow passage and the second stator flow passage; and
     a fourth coupling pattern where the second rotor flow passage couples the first stator flow passage and the third stator flow passage,
   wherein the control device is configured to operate in any of:
     a first mode that reciprocates between the first coupling pattern and the second coupling pattern; and
     a second mode that reciprocates between the third coupling pattern and the fourth coupling pattern.

2. A flow passage switching valve system comprising:
   the flow passage switching valve according to claim 1,
   wherein the control device is configured to receive a signal from a device that measures a state of a fluid in any of the flow passages and/or from the rotor and switch a mode based on the signal.

3. The flow passage switching valve system according to claim 1,
   wherein the control device is configured to switch whether to operate in the first mode or the second mode based on at least one of:
     a total rotation amount of the rotor;
     a total rotation period of the rotor;
     a total operation period of the flow passage switching valve system; and
     a number of passing of a fluid in the first stator flow passage, the second stator flow passage, the third stator flow passage, the first rotor flow passage, or the second rotor flow passage.

4. The flow passage switching valve system according to claim 2, wherein the control device is configured to switch whether to operate in the first mode or the second mode based on at least one of:
- a pressure or an amount of change of the pressure in the first stator flow passage, the second stator flow passage, the third stator flow passage, the first rotor flow passage, or the second rotor flow passage;
- a total flow rate in the first stator flow passage, the second stator flow passage, the third stator flow passage, the first rotor flow passage, or the second rotor flow passage;
- an amount of leak or a change of the amount of leak from the first stator flow passage, the second stator flow passage, the third stator flow passage, the first rotor flow passage, or the second rotor flow passage; and
- an amount of carry-over according to the first stator flow passage, the second stator flow passage, the third stator flow passage, the first rotor flow passage, or the second rotor flow passage.

5. A liquid chromatograph comprising:
the flow passage switching valve system according to claim 2;
a liquid sending pump;
a needle;
a syringe pump;
a separation column; and
a detector.

6. The flow passage switching valve system according to claim 1,
wherein the control device operates in the first mode until a predetermined number of rotations of the rotor is achieved and upon achieving the predetermined number of rotations, automatically switches to the second mode.

* * * * *